United States Patent [19]
Crooks et al.

[11] Patent Number: 5,115,107
[45] Date of Patent: May 19, 1992

[54] METHOD OF CORRECTING SKEW BETWEEN A DIGITIZER AND A DIGITAL DISPLAY

[75] Inventors: John F. Crooks; Robert L. Protheroe, both of Cambridge, Ohio

[73] Assignee: NCR Corporation, Dayton, Ohio

[21] Appl. No.: 640,321

[22] Filed: Jan. 11, 1991

[51] Int. Cl.⁵ .............................. G08C 21/00
[52] U.S. Cl. ...................... 178/18; 364/405; 340/712; 382/45
[58] Field of Search ............... 178/18, 19; 364/405; 340/712, 719, 724; 382/45, 46, 48

[56] References Cited

U.S. PATENT DOCUMENTS

| | | | |
|---|---|---|---|
| 4,622,437 | 11/1986 | Bloom et al. | 178/18 |
| 4,637,057 | 1/1987 | Kermisch | 382/46 |
| 4,678,869 | 7/1987 | Kable | 178/19 |
| 4,710,758 | 12/1987 | Mussler et al. | 340/712 |
| 4,848,496 | 7/1989 | Murakami et al. | 178/19 |
| 4,929,935 | 5/1990 | Rysavy et al. | 340/712 |

Primary Examiner—Stafford D. Schreyer
Attorney, Agent, or Firm—Biebel & French

[57] ABSTRACT

A method of producing an image drive signal which is free of skew. Disclosure is made of a point of sale merchandising system having a transparent digitizer mounted on an LCD module. A stylus is used to draw a signature on the digitizer, and the signature is displayed on the LCD module in registration with the moving stylus. Skew effects are eliminated by performing a mapping transformation using a set of 6 transformation constants. These constants are derived from data obtained while placing the stylus over three reference spots on the display.

8 Claims, 6 Drawing Sheets

FIG. 6

ANY STORE

6/7/90 137124

SOCKS, WHITE
1246794 $7.00

SHOES, BLACK
4679174 $73.45

SUB $80.45
TAX $ 5.23

TOTAL $85.68

CREDIT RECEIPT

ANY STORE
10 MAIN ST.
NY, NY 10003

| DATE | 01/04/80 |
| SUB | $80.45 |
| TAX | $5.23 |
| TOTAL | $85.68 |

EXPIRES 07/87
NO. 77996849436768
TEST ACCOUNT

SIGN HERE X *John Doe*

PAYMENT OF CHARGE SHALL BE MADE
UPON DEMAND OR PURSUANT TO
APPLICABLE CHARGE ACCOUNT

METHOD OF CORRECTING SKEW BETWEEN A DIGITIZER AND A DIGITAL DISPLAY

BACKGROUND OF THE INVENTION

This invention relates to the field of processing signature-based payment transactions wherein a merchant's records of payment are generated and maintained electronically without generation of paper records while providing paper receipts to customers as needed. It relates more particularly to a point of sale system using a transparent digitizer positioned over a display and still more particularly to a method of eliminating the effects of skew between the digitizer and the display.

In retailing and similar areas, the volume of transactions is often such that management of paper records is objectionably burdensome. Therefore paper records are being replaced by digital storage media wherever feasible. However, digital storage devices have not been able to eliminate the need for paper storage in many financial transactions requiring verification by a human signature. In such transactions paper documentation has continued to be the norm. This is particularly true in retail credit purchases wherein a signed copy of a sales receipt is required for validating the transfer of funds or for resolving disputes concerning the purchase. These paper records present inefficiency in retrieval as well as in storage.

It has now been found that signature verification of a credit transaction can be achieved without storing paper records, if a digitized copy of the obligor's signature is maintained along with a digital record of the sale. The present invention finds particular application in a newly proposed system which assembles all of the essential information regarding a sale, accepts and digitizes the purchaser's signature, prints a signed sales receipt for the purchaser, and stores a complete electronic record of the transaction, all in one operation at the point of sale station. The proposed arrangement, as discussed in commonly owned, copending application Ser. No. 575,096, filed Aug. 30, 1990, the disclosure of which is incorporated herein by reference, utilizes a transparent digitizer equipped with a stylus. When a user moves the stylus across the front surface of the digitizer, the position of the stylus is sensed and digitized. The digitizer is mounted against the surface of a liquid crystal display which is activated to display information relating to a transaction then in progress. Information which is so displayed can be seen through the digitizer and therefore is visible to the user.

In the above described system the digitized coordinates of the stylus are utilized to cause the display device to display a corresponding mark. It is desired that the displayed mark be in exact registration with the stylus, so that the user can make a normal handwritten signature and see it displayed as the writing progresses However, this requires that the digitizer and the display be in precise alignment. Any misalignment between the digitizer and the display device causes the progressing signature display to be out of registration with the movement of the stylus, thereby complicating eye-hand coordination for the user. A misalignment condition also produces a unsightly receipt by causing the signature to be printed out of alignment with other transaction information.

Misalignment consists of three components: offset, scale and skew. Offset is caused by a misalignment of absolute origins between the display and the digitizer coordinate systems. Scale misalignment is caused by an unequal distance per coordinate count between the two coordinate systems. Skew is caused by an apparent rotation between the two coordinate systems. Offset and scale correction is a simple matter while skew correction is not. This invention is an improvement over other methods in that it takes this skew factor into account.

Skew may be caused by inaccurate mounting of the digitizer on the display. It may also result from uneven heating of the digitizer surface during use. Digitizers which employ a resistive coating on the active surface are particularly susceptible to heat-induced skew. Other causes of skew may be low quality electronic components or a non uniformly deposited resistive coating on the digitizer. This invention addresses such problems.

SUMMARY OF THE INVENTION

The present invention provides a method of eliminating the effect of skew between a digitizer and a display device so as to enable production of a completed payment document having a captured customer signature in accurate registration with a digitally produced image of desired transaction information. The signature data is also in a form for transmission and storage as required for records maintained and used by the merchant and/or financial institution.

In accordance with the practice of this invention a digitizer having a transparent touch panel is placed over a display module which preferably comprises a liquid crystal display. A moveable stylus is connected to the digitizer and is moved across the active surface of the digitizer to generate position signals touch_x and touch_y representing the position of the stylus tip in a reference frame fixed to the digitizer.

Further in accordance with this invention a set of six transformation constants, including two scale constants m_x and m_y, two skew constants s_x and s_y and two offset constants b_x and b_y are established for correction of scale, skew and offset respectively. Image drive signals lcd_x and lcd_y are generated during cursive movement of the stylus by repetitively solving the equations $$lcd\_x = m\_x * touch\_x + s\_x * touch\_y + b\_x$$

and $$lcd\_y = m\_y * touch\_y + s\_y * touch\_x + b\_y$$

In a preferred embodiment of the invention the transformation constants are determined by using three sets of predetermined image drive signals to produce three reference spots on the display. The stylus is positioned at the three reference spots, and the resulting stylus position signals are read and stored. This produces six stylus position coordinates corresponding to six known image coordinates. These twelve coordinate values are substituted for the coordinate variables in the above pair of equations to obtain six equations expressing relationship between six unknown transformation constants. Values for the six transformation constants are obtained by simultaneous solution of these six equations. Thereafter, when these transformation constants are used for calculating image drive signals, the display unit produces image spots in accurate registrations with the tip of the stylus.

It is accordingly an object of the invention to provide a method for processing signature-based payment transactions in an efficient manner.

It is another object of this invention to eliminate skew effects from an image drive signal.

Other objects and advantages of the present invention will be apparent from the following description, the accompanying drawings, and the appended claims.

BRIEF DESCRIPTION OF THE DRAWINGS

FIG. 6 is a view showing a document comprising a combined bill of sale and store receipt which is printed by the printer.

DESCRIPTION OF THE PREFERRED EMBODIMENT

Figure 1:
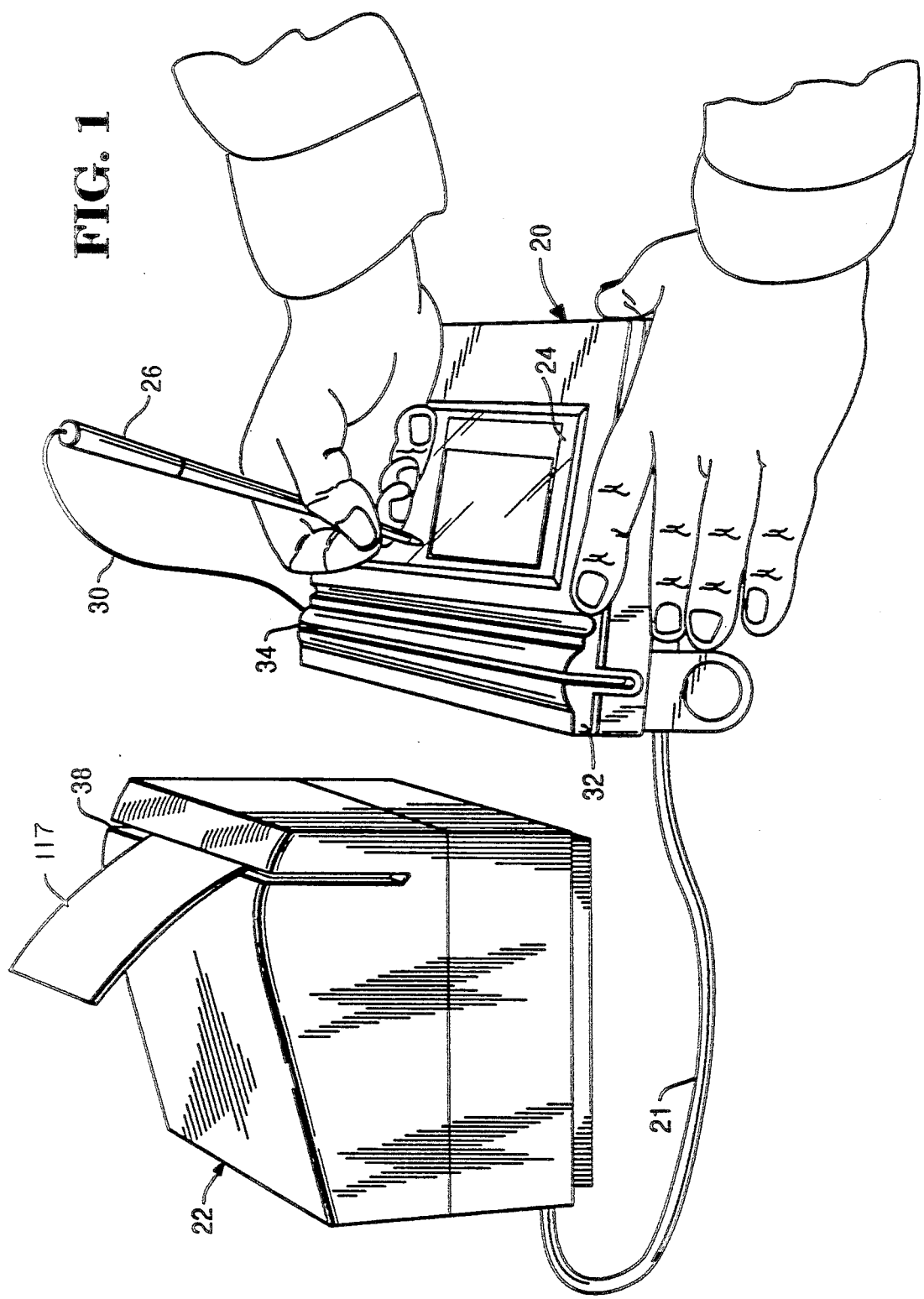
FIG. 1 is a perspective view of a write input apparatus and associated printer.

Reference now is made to FIG. 1, wherein is shown a perspective view of a write input apparatus 20 coupled to a printer 22 by a connector 21. Although this is shown as a direct connection or coupling, the actual coupling or connection may actually extend through one or more other devices, such as a controller, as will be described below. The write input device includes a transparent panel 46 through which information may be displayed and on which information may be entered by a human operator 28 through the use of a stylus 26. Stylus 26 is connected to input apparatus 20 by an electrically conductive line 30. The apparatus 20 may also include an integral magnetic stripe reader 32 having a slot 34 through which a card bearing magnetic indicia may be swiped, so that the data contained thereon can be read, stored, and used by the system which includes the write input apparatus 20 and the printer 22. The write input device 20 may be configured without the magnetic stripe reader 32, if not required.

The printer 22 will be used most commonly for printing customer receipts such as the receipt 117 which is shown as issuing from an aperture 38 in the housing of printer 22. Other types of record media could also be generated by the printer 22, if desired, in response to the needs of the system. Any suitable printer may be employed, such as an Epson RP265, marketed by Epson America, Inc., Torrance, Calif.

Figure 2:
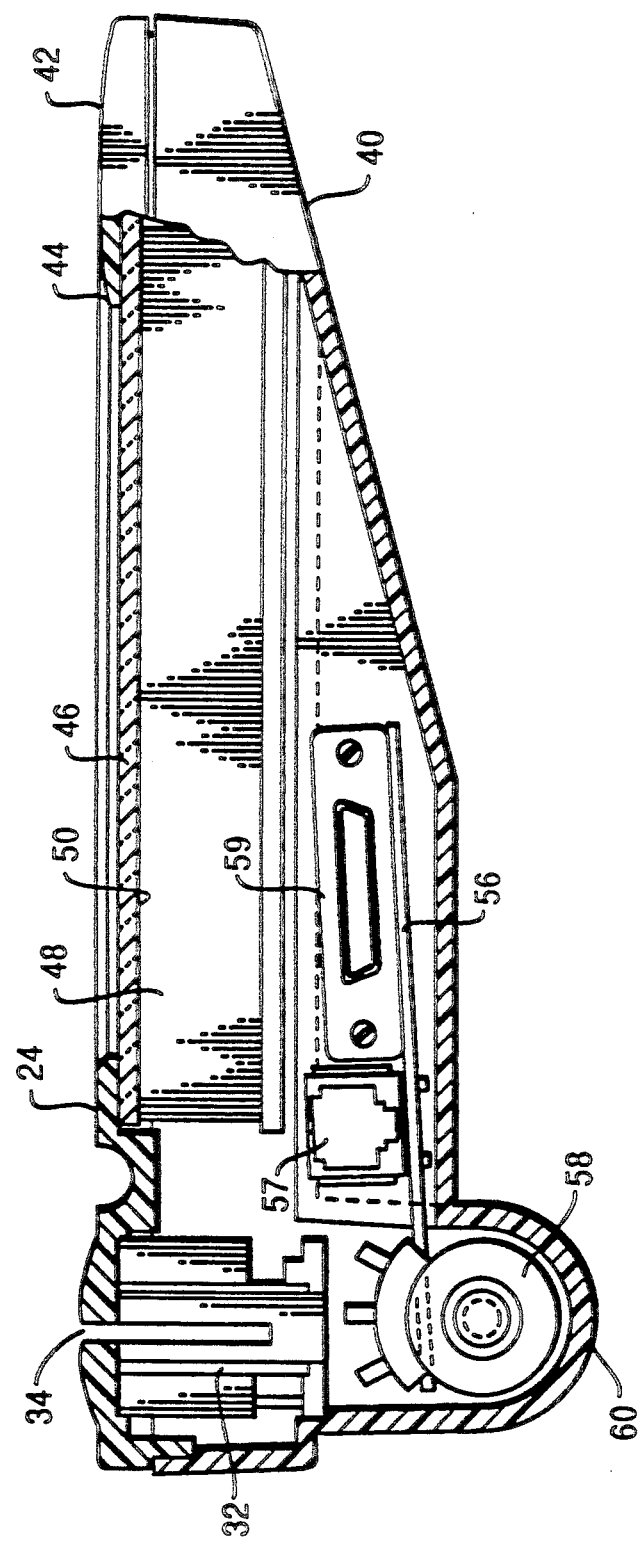
FIG. 2 is a sectional elevational view of the write input apparatus of FIG. 1.

As shown in the sectional view of FIG. 2, the write input apparatus 20 is contained within a lower housing 40 and an upper housing 42, which mate along the edges thereof. The upper housing 42 contains an aperture 44 in a frame 24 within which transparent panel 46 is placed. The panel 46 forms part of an interactive digitizer 47 (FIG. 5) which is capable of generating electrical signals representing the position of the stylus 26 relative to panel 46. Broadly speaking, during operation of the digitizer 47, the stylus 26 acts as a probe, and the differing potentials between sides of the digitizer, in two coordinate directions, are measured, converted into digital form, and are processed through correction algorithms to obtain digital position signals touch_x and touch_y. Techniques for generating position signals such as touch_x and touch_y are well known in the digitizer art and further description thereof is unnecessary herein. These position signals are used for generating image drive signals lcd_x and lcd_y, as hereinafter described. This enables a trace of the movement of the stylus to be captured and retained, as well as displayed on a liquid crystal display (LCD) module 48. Suitable interactive digitizers for this purpose are readily available from a number of sources. One such device is the ScreenWriter controller/digitizer/pen marketed by MicroTouch Systems Inc., Wilmington, Massachusetts. The operating details for another suitable digitizer are disclosed in Kable U.S. Pat. No. 4,678,869.

Liquid crystal display module 48 is positioned directly beneath the interactive transparent digitizer 46 and is visible therethrough. Liquid crystal display (LCD) module 48 is capable of displaying images in response to drive signals lcd_x and lcd_y or other electrical signals which are appropriately processed and applied thereto. Such other electrical signals may carry information from a card which has been read by magnetic stripe reader 32, or from a keyboard or other point-of-sale equipment. For example, LCD module 48 may be supplied with information which enables it to display an image 111 of a customer's name, a store name, a date, and the total charge for a transaction. The customer may verify the transaction and thereafter enter a personal signature for display. Other signals carrying the same and additional information, as required, may be supplied to printer 22 for printing paper receipt 117, the details of which may be as shown in FIG. 6.

It will be appreciated that digitizer 47 generates output signals which change at a relatively high clock frequency to more or less continuously represent the position of the tip of stylus 26 relative to the transparent panel 46. As hereinafter described in detail, a microprocessor converts this position data into LCD coordinates, so that display module 48 displays a continuously progressing image of the moving stylus tip. This image is visible through the transparent panel 46, and therefore the customer is presented with what appears to be a normally written signature. The image of this signature is captured on the printed receipt 117 as well as in the system memory.

Figure 3:
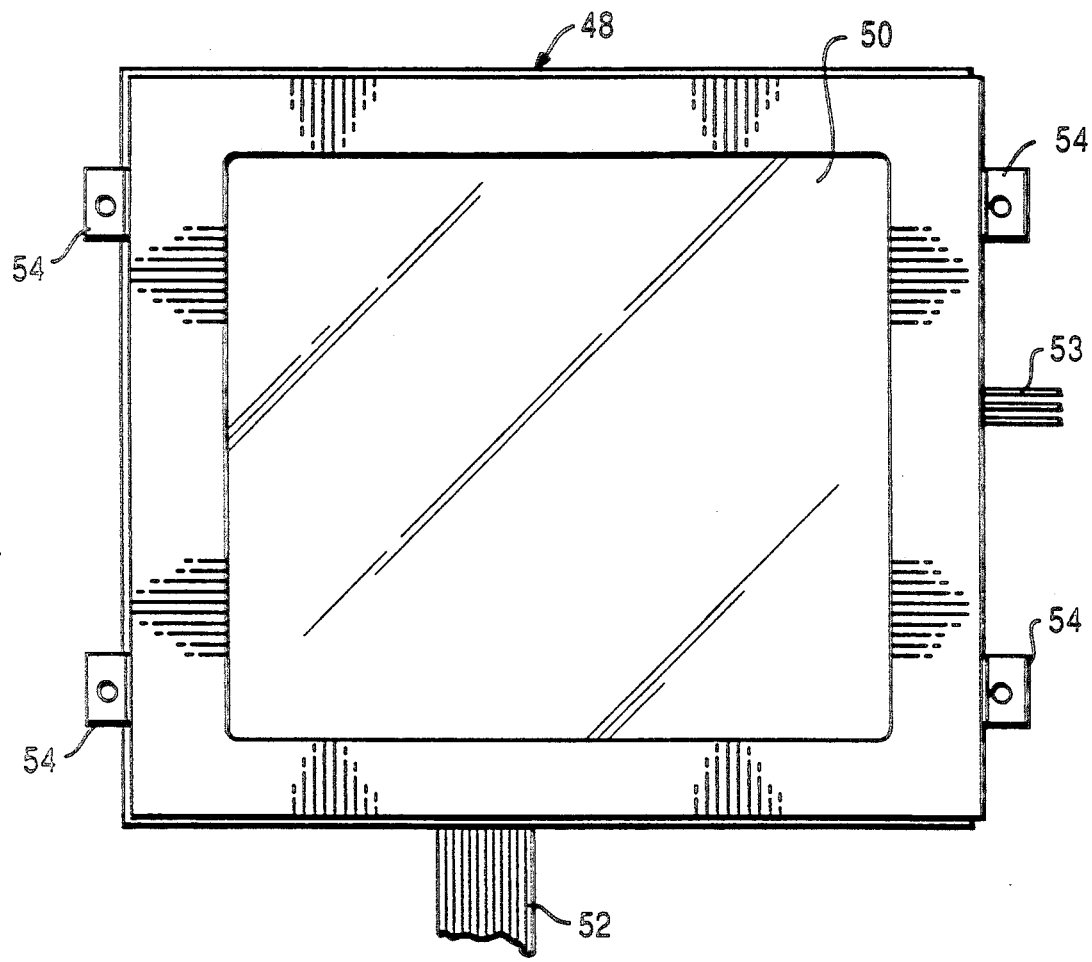
FIG. 3 is a plan view of a liquid crystal display module which is used in the write input apparatus.
Figure 4:
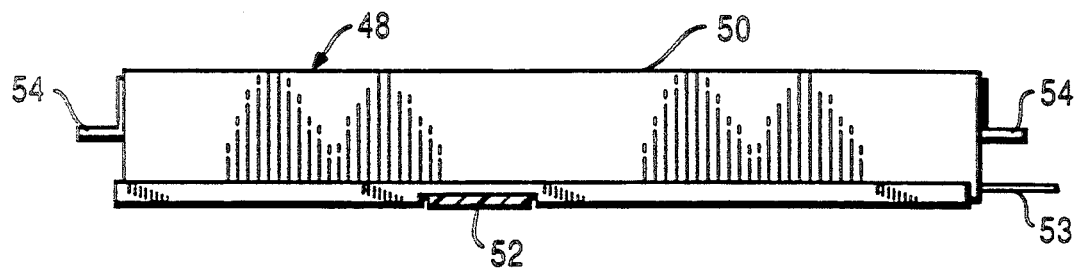
FIG. 4 is an elevational view of the liquid crystal display module of FIG. 3.

FIGS. 3 and 4 are plan and elevation views of LCD module 48. A display screen 50 forms part of the top surface of the module. A cable 52 provides electrical input connections for supplying power and data signals to the module. Electrical conductors 53 provide power to fluorescent tubes for back-lighting the screen 50. Brackets 54 are secured to the module to enable it to be mounted securely within the apparatus 20. LCD modules of this type are commercially available, and one such module which may be employed in the present invention is Model EG7500, marketed by Epson America, Inc., Torrance, Calif.

The magnetic stripe reader 32 and its slot 34 are shown to be located in the upper left portion of the apparatus 20, as viewed in FIG. 2. A control circuit board 56 which functions as a controller for the digitizer 47 is located below the LCD module 48 in the lower housing 40 of the apparatus 20 and includes a connector 57 for connection to the digitizer element 46 and also includes an RS232 connector 59 to a PC controller 64. A contrast control 58 for changing the contrast of the screen 50 of the LCD module 48 is located in a semicylindrical lower extension 60 of the lower housing 40, which extension also serves as a foot or support for supporting the apparatus 20 on a work surface.

Figure 5:
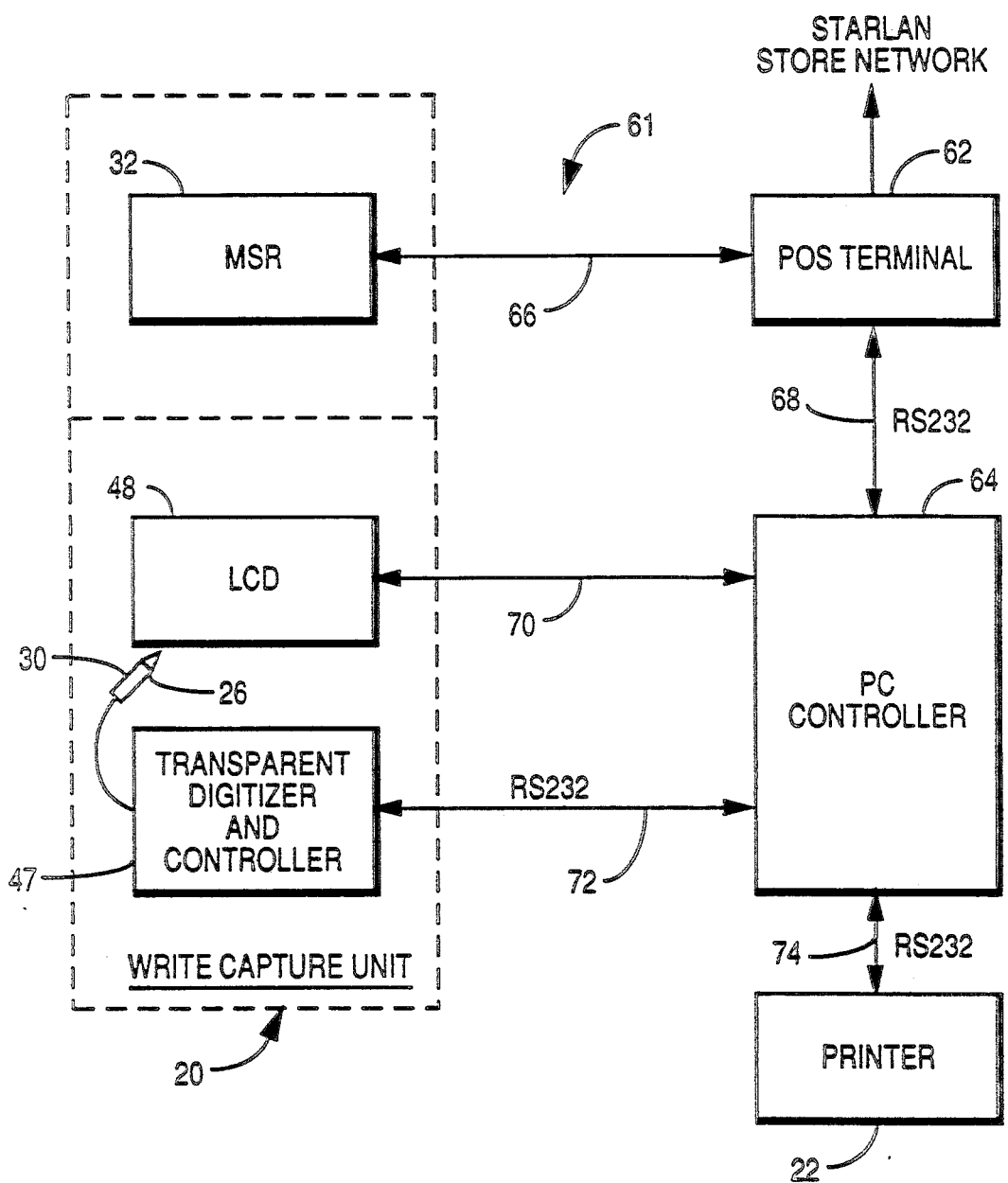
FIG. 5 is a block diagram of a system which includes the write input apparatus.

FIG. 5 is a block diagram of a system 61 which includes the write input apparatus 20 and the printer 22, in addition to the magnetic stripe reader 32, a point of sale (POS) terminal 62 and a personal computer functioning as a controller 64. The write input apparatus 20 is shown in block form in phantom lines, and includes the LCD module 48 and the interactive digitizer element and controller 47, with associated stylus 26. The magnetic stripe reader 32 is shown in a separate phantom line block, to indicate that it may be a separate freestanding device, rather than being integrated into the housing of the write input apparatus 20, if desired. The POS terminal 62 may be any suitable device of that type, such as a Class 7052 terminal, marketed by NCR Corporation, Dayton, Ohio. The personal computer 64 which functions as a controller may be any suitable personal computer, such as a Model PC 810, marketed by NCR Corporation, Dayton, Ohio. Personal computer 64 includes a microprocessor (not illustrated) which is programmed to perform the calculations hereinafter discussed. A Display Master model YDM6420 graphics adapter, marketed by Yahama Corporation of America, San Jose, Calif., is incorporated into the computer 64, and functions to drive the LCD module 48. An NCR Corporation part no. 017-0035367B RS 232 adapter board adds required additional serial ports for communications.

The magnetic stripe reader 32 is connected via a path 66 to the POS terminal 62, which in turn is connected by an RS232 data bus 68 to the PC controller 64. The LCD display 48 is connected via a path 70 to the PC controller 64, and in effect takes the place of the CRT display which would normally be associated with the PC. Digitizer 47 is connected to the PC controller 64 by an RS232 data bus 72 which carries the position signals touch_x and touch_y from the digitizer to the PC. The above noted microprocessor carries out appropriate transformation to convert touch_x and touch_y to the image drive signals lcd_x and lcd_y which are supplied to the graphics adapter. The graphics adapter then activates the appropriate LCD pixels via line 70. Another data bus 74 connects the PC controller 64 to the printer 22. The POS terminal 62 may be connected to other data processing facilities in an establishment in which it is used, such as a STARLAN store network.

When a transparent digitizer is used in conjunction with a display as described above, the microprocessor must deal with two different reference systems. The output signals from digitizer 47 indicate the position of the stylus in digitizer coordinates. These coordinates must be mapped into the reference system of display 48 in order to produce an accurately registered image of the stylus tip. In the special case where the skew angle $\theta = 0$, the display coordinates are given by the equations:

$$lcd\_x = m0\_x * touch\_x + b0\_x$$

$$lcd\_y = m0\_y * touch\_y + b0\_y$$

where:

$m0\_x$ & $m0\_y$ are scale constants, and $b0\_x$ & $b0\_y$ are offset constants.

These equations are easily solved by any commercially available microprocessor.

Figure 7:
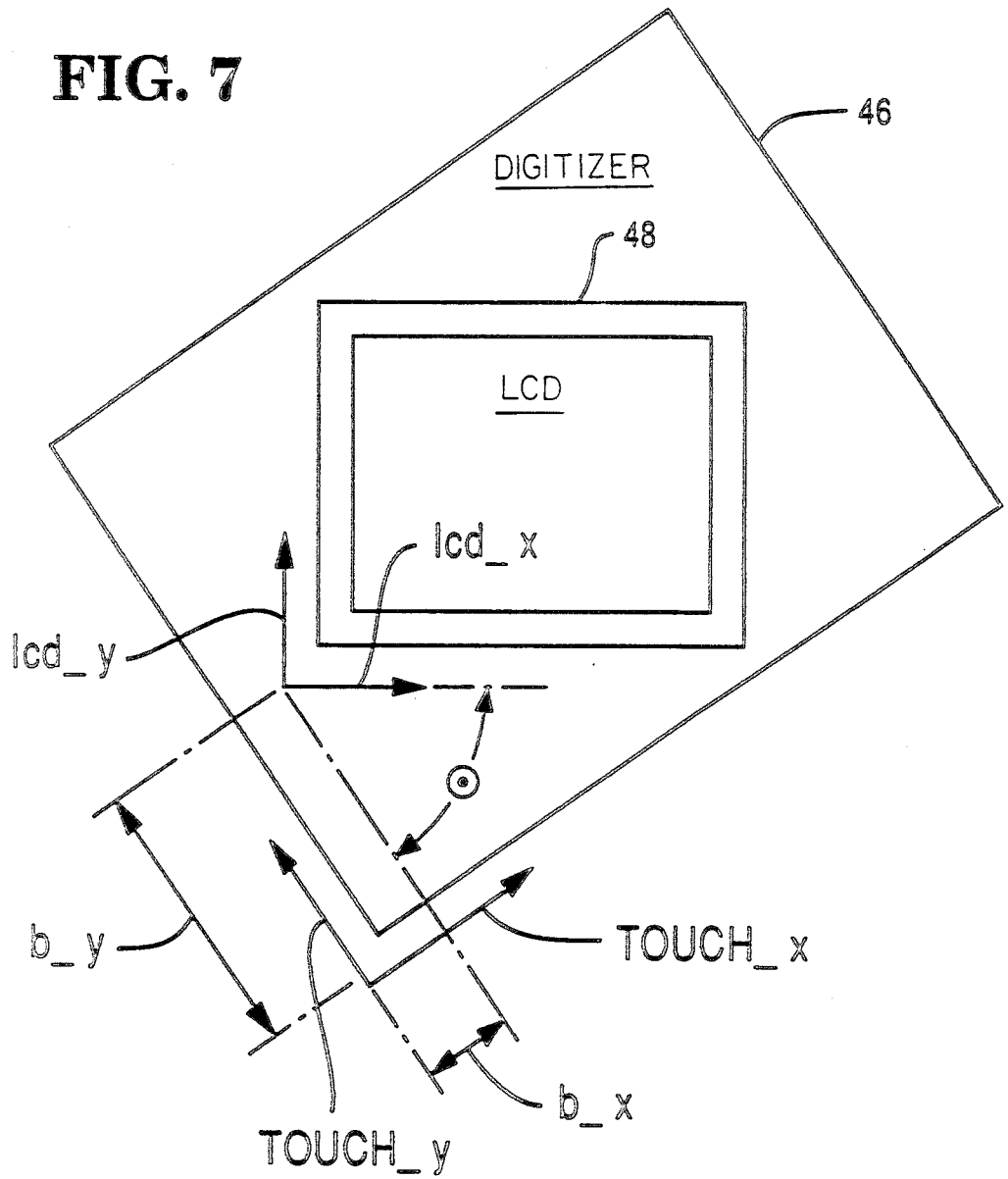
FIG. 7 is a schematic illustration of coordinate systems attached to a digitizer and a display surface which are offset and skewed with respect to each other.

The more general case of a non-zero skew angle is illustrated in FIG. 7. As shown therein, the origin of the coordinate system for LCD unit 48 is displaced from the origin of the digitizer coordinate system by offset distances $b\_x$ and $b\_y$ and is rotated by a skew angle $\theta$. In this case the equations for the display coordinates take the form:

$$lcd\_x = m\_x * touch\_x + s\_x * touch\_y + b\_x$$

$$lcd\_y = m\_y * touch\_y + s\_y * touch\_x + b\_y$$

which employ scale constants $m\_x$ & $m\_y$, skew constants $s\_x$ & $s\_y$, and offset constants $b\_x$ & $b\_y$. It may be shown that these generalized transformation constants are related to the "non-skew" constants by the equations:

$$m\_x = m0\_x * cos(\theta)$$

$$m\_y = m0\_y * cos(\theta)$$

$$s\_x = m0\_y * sin(\theta)$$

$$s\_y = -m0\_x * sin(\theta)$$

$$b\_x = b0\_x * cos(\theta) + b0\_y * sin(\theta)$$

$$b\_y = b0\_y * cos(\theta) - b0\_x * sin(\theta)$$

In the practice of this invention it is preferred to make no measurement of the skew angle. Instead the invention proceeds by storing the coordinate; (lcd_x1,lcd_y1); (lcd_x2,lcd_y2); and (lcd_x3, lcd_y3) of three reference points in a non-volatile memory. These three coordinate pairs are read in sequence by the microprocessor and transferred to the graphics adapter for causing three reference spots to appear in sequence on the display. A human operator places the tip of the stylus over each displayed spot, as viewed through the transparent digitizer. The microprocessor then reads the digitizer coordinates touch_x1,touch_y1; touch_x2,touch_y2; and touch_x3,touch_y3 for each point touched by the operator. The coordinate data for the three points then are used to compute the generalized transformation constants by inversely solving the following six equations:

$$lcd\_x1 = m\_x * touch\_x1 + s\_x * touch\_y1 + b\_x$$

$$lcd\_x2 = m\_x * touch\_x2 + s\_x * touch\_y2 + b\_x$$

$$lcd\_x3 = m\_x * touch\_x3 + s\_x * touch\_y3 + b\_x$$

$$lcd\_y1 = m\_y * touch\_y1 + s\_y * touch\_x1 + b\_y$$

$$lcd\_y2 = m\_y * touch\_y2 + s\_y * touch\_x2 + b\_y$$

$$lcd\_y3 = m\_y * touch\_y3 + x\_y * touch\_x3 + b\_y$$

The solution proceeds by first computing the value of the determinant det where:

$$det = touch\_x1(touch\_y2 - touch\_y3) + touch\_x2(touch\_y3 -$$

-continued $$\text{touch}\_y1) + \text{touch}\_x3(\text{touch}\_y1 - \text{touch}\_y2)$$

Then det is substituted into the following expressions:

$$m\_x = [\text{lcd}\_x3(\text{touch}\_y2 - \text{touch}\_y1) + \text{lcd}\_x2(\text{touch}\_y1 -$$

$$\text{touch}\_y3) + \text{lcd}\_x1(\text{touch}\_y2 - \text{touch}\_y3)]/\text{det}$$

$$s\_x = [\text{lcd}\_x3(\text{touch}(x2 - \text{touch}\_x1) + \text{lcd}\_x2(\text{touch}\_x1 -$$

$$\text{touch}\_x3) + \text{lcd}\_x1(\text{touch}\_x3 - \text{touch}\_x2)]/\text{det}$$

$$b\_x = \text{lcd}\_x1 - m\_x(\text{touch}\_x1) - s\_x(\text{touch}\_y1)$$

$$m\_y = [\text{lcd}\_y3(\text{touch}\_x2 - \text{touch}\_x1) + \text{lcd}\_y2(\text{touch}\_x1 -$$

$$\text{touch}\_x3) + \text{lcd}\_y1(\text{touch}\_x3 - \text{touch}\_x2)]/\text{det}$$

$$s\_x = [\text{lcd}\_y3(\text{touch}\_y1 - \text{touch}\_y2) + \text{lcd}\_y2(\text{touch}\_y3 -$$

$$\text{touch}\_y1) + \text{lcd}\_y1(\text{touch}\_y2 - \text{touch}\_y3)]/\text{det}$$

$$b\_y = \text{lcd}\_y1 - m\_y(\text{touch}\_y1) - s\_y(\text{touch}\_x1)$$

which are evaluated by the system microprocessor or other computing device to obtain values for the transformation constants. While the computations are somewhat tedious, they are easily performed by the system microprocessor. Object code for this purpose may be compiled from a straight forward C language program or a program written in FORTRAN or other source code adapted for compiling. Assembly language may also be used, if desired. The constants, so established, are stored for use during a merchandising operation to calculate correct values for the image drive signals lcd_x and lcd_y.

It will be understood that it is not necessary to establish the three above-described reference points in order to obtain the required transformation constants. Alternatively, the non-skew scale constants m0_x and m0_y may be established experimentally, and the non-skew offset constants b0_x and b0_y may be measured. Then the skew angle θ may be measured, following which the generalized transformation constants may be calculated using the equations outlined above.

In another embodiment digitizer 46 may have its surface imbedded with a grid, as taught by Kable U.S. Pat. No. 4,678,869. This effectively subdivides the surface into a set of sub-sectors. In this arrangement a separate set of transformation constants may be established for each subsector. Such a method is useful for correcting small irregularities over the digitizer, as opposed to correcting only gross irregularities using one set of constants over the entire digitizer.

It will be appreciated that the skew correction invention described herein is not limited to use with a hand held stylus or to use with a transparent digitizer. The invention applies also to the correction of skew in devices of the type where touch coordinates are derived by sensing the touch of a human finger. The invention further has application to systems wherein touch signals are used to initiate the generation of different displays in correspondence with the position of the point of touch. In these latter devices the generated image position signals lcd_x and lcd_y are compared with stored reference values thereof in order to identify the particular image to be displayed. Such a technique could be used, for instance, to determine whether a user had touched a specific icon on an opaque digitizer.

While the method herein described constitutes a preferred embodiment of the invention, it is to be understood that the invention is not limited to this precise method and that changes may be made therein without departing from the scope of the invention which is defined in the appended claims.

What is claimed is:

1. The method of producing image position signals lcd_x and lcd_y for a display device comprising the steps of:

mounting a digitizer in fixed relation to said display device; said digitizer being provided with touch sensing means for generating position signals touch_x and touch_y representing the position of a point at which said digitizer has been touched, establishing two skew constants s_x and s_y and two offset constants b_x and b_y respectively representing the skew angle and the offset distance between said digitizer and said display device, establishing two scale constants m_x and m_y representing scale differences between said stylus position signals and said image drive signals, and generating said image position signals according to the equations:

$$\text{lcd}\_x = m\_x * \text{touch}\_x + s\_x * \text{touch}\_y + b\_x$$

and $$\text{lcd}\_y = m\_y * \text{touch}\_y + s\_y * \text{touch}\_x + b\_y$$

2. The method of claim 1 and further comprising the step of comparing said image position signals with predetermined reference values thereof to determine the location of said point of touch.

3. The method of producing an image on a display comprising the steps of:

generating image position signals according to the method of claim 1, generating an image signal representative of said image, producing said image by applying said image signal to said display, and using said positioning signals to position said image on said display.

4. The method of producing image position signals lcd_x and lcd_y for a display device comprising the steps of:

mounting a digitizer in fixed relation to said display device; said digitizer being provided with moveable stylus means and stylus sensing means connected to said stylus means for generating stylus position signals touch_x and touch_y representing the position of the tip of said stylus relative to said digitizer, establishing two skew constants s_x and s_y and two offset constants b_x and b_y respectively representing the skew angle and the offset distance between said digitizer and said display device, establishing two scale constants m_x and m_y representing scale differences between said stylus position signals and said image drive signals, and generating said image drive signals by solving the equations:

$$\text{lcd}\_x = m\_x * \text{touch}\_x + s\_x * \text{touch}\_y + b\_x$$

and $$\text{lcd}\_y = m\_y * \text{touch}\_y + s\_y * \text{touch}\_x + b\_y$$

5. The method of claim 4 wherein said digitizer has a transparent panel mounted on top of said display device; said method comprising the steps of:

viewing said display device through said panel, and concomitantly moving said stylus cursively in contact with said panel.

6. The method of claim 5 wherein said constants are established by the steps of:

generating image drive signals having reference values for displaying spots at three reference positions on said display, positioning said stylus on said panel in registration with said spots, generating stylus position signals having reference values associated with the reference values for said image drive signals, and using the reference values of said image drive signals and the reference values of said stylus position signals to calculate said constants.

7. In a user activated terminal for the entry of transaction-related data comprising display means responsive to an image drive signal for displaying transaction-related data, a transparent panel mounted above said display surface in fixed but skewed relation thereto, a stylus electrically coupled to said panel and adapted for guided movement across the surface thereof, digitizing means connected to said panel and to said stylus for generating a position signal representing the position of said stylus relative to said panel, and computing means connected to said digitizing means for receiving said positioning signal and responsive thereto for generating said image drive signal; the method of producing said image drive signal comprising the steps of:

establishing the coordinates (touch_x1,touch_y1); (touch_x2,touch_y2); and (touch_x3,touch_y3), for three touch points on said panel which are in registration with three reference points on said display means having coordinates (lcd_x1,lcd_y1); (lcd_x2,lcd_y2); and (lcd_x3,lcd_y3)

using the coordinates of said touch points and said reference points to establish two offset constants $b\_x$ & $b\_y$, two scale constants $m\_x$ & $m\_y$, and two skew constants $s\_x$ & $s\_y$ such that:

$$1\ cd\_x1 = m\_x * touch\_x1 + s\_x * touch\_y1 + b\_x$$

$$1\ cd\_x2 = m\_x * touch\_x2 + s\_x * touch\_y2 + b\_x$$

$$1\ cd\_x3 = m\_x * touch\_x3 + s\_x * touch\_y3 + b\_x$$

$$1\ cd\_y1 = m\_y * touch\_y1 + s\_y * touch\_x1 + b\_y$$

$$1\ cd\_y2 = m\_y * touch\_y2 + s\_y * touch\_x2 + b\_y$$

$$1\ cd\_y3 = m\_y * touch\_y3 + x\_y * touch\_x3 + b\_y.$$

storing all of said constants, supplying the coordinates touch_x and touch_y of an arbitrary point on said panel to said computing means, and calculating coordinate values lcd_x and lcd_y for said image signal by causing said computing means to solve the equations:

$$lcd\_x = m\_x * touch\_x + s\_x * touch\_y - b\_x$$

and $$lcd\_y = m\_y * touch\_y - s\_y * touch\_x - b\_y.$$

8. A method according to claim 7 wherein said digitizer is divided into sub-sectors, and sets of scale constants, skew constants and offset constants are separately established for each sub-sector.

* * * * *